Patented Dec. 18, 1945

2,391,087

UNITED STATES PATENT OFFICE 2,391,087

OIL SOLUBILIZING COMPOSITIONS

Theodore R. Donlan, Union, and Albert Gathman, Elizabeth, N. J., assignors to Standard Oil Development Company, a corporation of Delaware No Drawing. Application December 17, 1941, Serial No. 423,302

3 Claims. (Cl. 252—161)

This invention relates to oil solubilizing compositions and particularly to oil solubilizing compositions for petroleum oils. For many industrial uses such as the cleaning of oil-stained surfaces on certain types of machinery and factory floors and the removal of greasy and oily materials from metallic surfaces prior to their plating, solubilizing compositions are uniquely effective and relatively inexpensive to employ. These compositions which have the ability either to solubilize or readily emulsify oils in water are usually prepared for commercial distribution in the form of concentrates and further quantities of solvent oils or solvents are added as required for the particular application. Many types of emulsifying agents have been utilized in this capacity for decreasing interfacial tension and assisting the dispersion of the oil in water, while others have been employed as emulsification stabilizing agents which prevent de-emulsification.

This invention is particularly concerned with solubilizing compositions for petroleum fractions of the kerosene, solvent and light lubricating oil ranges. A concentrate prepared according to the invention contains a mineral oil soluble sulfonate, a fatty acid, a wetting agent and a suitable blending agent. Thus, a formula for a concentrate suited for use with kerosene is:

|  | Per cent weight |  |
|---|---|---|
| Oil soluble sodium sulfonate of composition | 60% | |
| Mineral oil | 10% | 74.00 |
| Water | 30% | |
| Oleic acid | | 4.00 |
| Sodium-alkyl-naphthalene-sulfonate | | 2.00 |
| Sec. butyl alcohol | | 20.00 |

The above composition when diluted to the extent of one part to twelve parts of either solvent oil or kerosene, is highly advantageous in metal plating as a precleaner previous to alkaline cleansing to remove carbon smut and solid residues as the result of the use of drawing compositions. The oily and greasy materials on the metal surface are dissolved in the oil of the composition due to its ability to oil-wet the surface, due to the effect largely of the oil soluble sulfonate. Then when washed with water, the surface is completely freed of the oil film and with it the attendant solid particles. For the cleansing of automobile engines, airplane fuselages, garage floors, etc., dilution of the above composition with five (5) parts of kerosene is the usual amount and the surface after treatment with the diluted composition treated with water to effect its removal.

In preparing a composition according to the invention, it is usual to employ the sulphonates extracted from petroleum oils. Suitable oil soluble sulphonates are readily extracted from petroleum fractions, especially those of the kerosene and lubricating oil ranges after intensive treatment thereof with concentrated sulphuric acid and extraction from the neutralized sludge-free oil by means of alcoholic solutions. For the purpose of the present invention the oil soluble sulfonates are given some measure of purification in order to remove appreciable quantities of water. This purification may be effected by evaporating alcoholic solutions of the sulfonates to about 50% of its volume and then treating the curds so formed with a solvent, which dissolves the sulfonate and leaves undissolved the water. The oil-soluble sulfonate of any of the more common metals may be utilized in the composition of the invention but it is generally preferable and less costly to use the derivatives of the lower alkali metals, especially those of sodium and potassium. The amounts in which sulfonate compounds are employed in the concentrated composition as given above may vary from about 50% to 80% by weight.

Instead of oleic acid in the concentrate, any fatty acid having between about 10 and 20 carbon atoms in the molecule may in general be used. These acids impart to the composite wetting characteristics for metallic surfaces and enhance the ability of the wetting and emulsifying agents also present in the composition to remove dirt and oil from fouled surfaces. For these purposes, the mono unsaturated acids, especially oleic acid, are particularly effective and therefore preferred compounds. The amounts in which these acids are employed in the concentrate vary from about 2 to 5% by weight.

In the concentrate, sodium-alkyl-naphthalene-sulfonate is given as an example of an advantageous wetting and emulsifying agent. However, any compound having wetting and emulsifying properties for oil and water mixtures may be employed in amounts from about 1% to 4% by weight of the concentrate. These compounds are effective in the composition to insure removal of dirt from the fouled surfaces. Suitable compounds are determined largely by their solubility characteristics as dependent upon the presence in the molecule of a water solubilizing or hydrophilic grouping and the presence in the molecule of an oil solubilizing or hydrophobic grouping. A suitable wetting agent for the purpose of this invention must be relatively chemically inert, have suitable solubility characteristics relative to both water and mineral oil and be of such a nature as to present a balance between the relative solubilities of the compound in oil and aqueous solutions. Furthermore it is important that the chemical nature of the wetting agent be suitable for use in both hard and soft waters, that is, the derivatives with the alkaline earth materials be sufficiently soluble in water to prevent their precipitation in aqueous solutions. Among the groupings whose presence in the molecule of the wetting agent imparts hydrophilic characteristics are those having the general formulae $SO_3X$, $COOX$, $OX$ and $PO_3X_2$ wherein X represents hydrogen, an alkali metal, an equivalent of an alkaline-earth metal, ammonium or substituted ammonium. Hydrophobic groupings, on the other hand, are the highly hydrocarbon groupings such as long chain alkyls and naphthene rings.

In the concentrated composition, it is essential that there be present a blending agent such as secondary butyl alcohol as given in the illustrative formula of a concentrate according to the invention. The nature of this mutual solvent liquid depends primarily upon the nature of the other constituents in the concentrate. It is found, however, that a liquid of solvent characteristics of low solubility in water and relatively good miscibility in the commonly available organic liquids is advantageous. Suitable materials are the lower monohydric alcohols containing between 3 and 6 carbon atoms in the molecule and the higher ketones and the highly aromatic petroleum fractions such as may be obtained for example by the extraction with liquid sulphur dioxide of kerosene distillates are suitable. The amounts in which the blending agent is present in the composition concentrate depends largely upon its own solvent characteristics and the nature of the other constituents in the composition. It is usually found advisable however to have between 15% and 25% by weight in the composition.

Evaluation of suitable solubilizing compositions for mineral oils is readily determined by their wetting characteristics. The determination of the wetting characteristics of the wetting composition can be suitably made by measuring the time required for standard cloth disc to sink in a suitably diluted composition. In evaluating the wetting characteristics of a composition according to the present invention the composition of formula previously given was first diluted in five parts by weight of kerosene and the emulsified solution added to 100 parts of water. For comparison, commercially available solubilizing compositions considered particularly effective in regard to kerosene were similarly tested. The results were as follows:

| | Composition 1 | Composition 2 | Composition 3 | Composition of invention |
|---|---|---|---|---|
| Time in secs. for disc to sink | 400+ | 400+ | 22 | 8 |

Particularly good characteristics of the composition prepared according to the invention are clearly indicated by its good wetting characteristics.

This description of the invention has been largely given with regard to the preparation of an oil solubilizing composition for a petroleum fraction of kerosene boiling range and its use thereof but it is to be understood that the emulsifying compositions according to this invention may also be prepared from other hydrocarbon oils and petroleum fractions. In all cases the compositions so prepared are particularly commercially advantageous in that they are substantially odorless and non-toxic. A further advantage of the compositions of this invention is that small traces on metallic surfaces are non-corrosive. The compositions of the invention are widely applicable for use as slushing compositions, cooling and lubricating compositions in the cutting and turning of metals, and as cleansing and polishing compositions. It is to be understood that the scope of the invention is not to be limited by the description given but by the appended claims or their equivalents.

What is claimed is:

1. An oil solubilizing composition, comprising a mineral oil soluble sulfonate extracted from a petroleum oil in an amount between 50 and 80 per cent by weight, a mono-unsaturated fatty acid containing about between 10 and 20 carbon atoms in the molecule, in an amount between about 2 and 5 per cent by weight, a sodium-alkyl-naphthalene-sulfonate in an amount between about 1 and about 4 per cent by weight, and between 15 and 25 per cent by weight of a monohydric alcohol containing between 3 and 6 carbon atoms in the molecule.

2. An oil solubilizing composition, comprising an oil soluble sodium sulfonate in an amount about 74 per cent by weight, oleic acid in an amount about 4 per cent by weight, sodium-alkyl-naphthalene-sulfonate in amount of about 2 per cent by weight and secondary butyl alcohol in amount of about 20 per cent by weight.

3. An oil solubilizing composition according to claim 1 in which the unsaturated fatty acid containing between about 10 and 20 carbon atoms in the molecule is oleic acid.

THEODORE R. DONLAN.
ALBERT GATHMAN.